(12) United States Patent
Vanhorn et al.

(10) Patent No.: US 9,676,137 B2
(45) Date of Patent: Jun. 13, 2017

(54) BLOW MOLDED AIRFLOW CONDUIT WITH OUTER INSULATION

(71) Applicant: International Automotive Components Group North America, Inc., Southfield, MI (US)

(72) Inventors: David Vanhorn, Famington Hills, MI (US); Paul Nagy, Macomb, MI (US)

(73) Assignee: International Automotive Components Group North America, Inc., Southfield, MI (US)

(*) Notice: Subject to any disclaimer, the term of this patent is extended or adjusted under 35 U.S.C. 154(b) by 154 days.

(21) Appl. No.: 14/524,417

(22) Filed: Oct. 27, 2014

(65) Prior Publication Data

US 2016/0114520 A1    Apr. 28, 2016

(51) Int. Cl.
*B29C 49/20*    (2006.01)
*B29C 49/42*    (2006.01)
(Continued)

(52) U.S. Cl.
CPC .............. *B29C 49/20* (2013.01); *B29C 49/04* (2013.01); *B29C 49/24* (2013.01);
(Continued)

(58) Field of Classification Search
CPC ..... B29C 49/20; B29C 49/24; B29C 49/4205; B29C 2049/2483; B29C 49/4817;
(Continued)

(56) References Cited

U.S. PATENT DOCUMENTS 3,126,139 A    3/1964   Schechter
4,737,099 A *  4/1988   Kaminski .......... B29C 49/2408
                                                264/509
(Continued)

FOREIGN PATENT DOCUMENTS

DE    4315838 A1 * 11/1994   .......... B01D 29/012
EP    1504933 A1    2/2005
(Continued)

OTHER PUBLICATIONS

Partial machine translation of JP 57-185120 A dated Nov. 1982 obtained from the JPO website.*
(Continued)

*Primary Examiner* — Robert B Davis
(74) *Attorney, Agent, or Firm* — Grossman, Tucker, Perreault & Pfleger, PLLC

(57) ABSTRACT

A method of forming a blow molded plastic article wherein the article comprises an airflow conduit, comprising: providing a first sheet of insulation material located on a insulation carrier; providing a blow molding mold including two halves and having a molding surface defining a molding cavity to form the article; locating the insulation carrier between the two halves of the blow molding mold; transferring the first sheet of insulation material from the insulation carrier to the blow molding mold; introducing an extrudate of thermoplastic composition between the two halves of the blow molding mold; closing the blow molding mold; forming the extrudate to a shape of the mold cavity of the blow molding mold to form the article; and bonding the extrudate to the first sheet of insulation material as the extrudate is being formed to the shape of the mold cavity.

25 Claims, 11 Drawing Sheets

(51) Int. Cl.
| | |
|---|---|
| *B29C 49/04* | (2006.01) |
| *B29K 101/12* | (2006.01) |
| *B29K 675/00* | (2006.01) |
| *B29L 9/00* | (2006.01) |
| *B29C 49/24* | (2006.01) |
| *B29L 23/00* | (2006.01) |
| *B29K 105/04* | (2006.01) |
| *B29C 49/48* | (2006.01) |
| *B29C 49/60* | (2006.01) |
| *B29C 51/08* | (2006.01) |
| *B29C 51/36* | (2006.01) |

(52) U.S. Cl.
CPC ...... *B29C 49/4205* (2013.01); *B29C 49/4817* (2013.01); *B29C 49/60* (2013.01); *B29C 51/08* (2013.01); *B29C 51/36* (2013.01); *B29C 2049/2017* (2013.01); *B29C 2049/2412* (2013.01); *B29C 2049/2431* (2013.01); *B29C 2049/2454* (2013.01); *B29C 2049/2458* (2013.01); *B29C 2049/2472* (2013.01); *B29C 2049/2477* (2013.01); *B29C 2791/001* (2013.01); *B29C 2791/006* (2013.01); *B29C 2791/007* (2013.01); *B29C 2793/009* (2013.01); *B29C 2793/0018* (2013.01); *B29K 2101/12* (2013.01); *B29K 2105/04* (2013.01); *B29K 2105/045* (2013.01); *B29K 2105/046* (2013.01); *B29K 2675/00* (2013.01); *B29K 2715/003* (2013.01); *B29K 2995/0002* (2013.01); *B29K 2995/0015* (2013.01); *B29L 2009/00* (2013.01); *B29L 2023/225* (2013.01)

(58) Field of Classification Search
CPC .... B29C 2049/2454; B29C 2049/2472; B29C 2049/2477; B29C 2049/2458; B29C 2049/2412; B29C 51/08; B29C 51/36; B29C 2793/0018; B29L 2023/225
See application file for complete search history.

(56) References Cited

U.S. PATENT DOCUMENTS

| | | | | |
|---|---|---|---|---|
| 5,114,767 | A * | 5/1992 | Berns | B29C 49/0047 156/287 |
| 6,053,215 | A * | 4/2000 | Sadr | B29C 49/24 138/178 |
| 6,071,370 | A | 6/2000 | Stiles | |
| 6,099,789 | A * | 8/2000 | Sumi | B29C 49/0005 264/516 |
| 8,349,245 | B2 * | 1/2013 | Ishida | B29C 49/2408 264/257 |
| 2007/0134485 | A1 | 6/2007 | Collins | |

FOREIGN PATENT DOCUMENTS

| | | | |
|---|---|---|---|
| JP | 57185120 A | * | 11/1982 |
| JP | H06166096 A | | 6/1994 |
| JP | 07016998 A | * | 1/1995 |

OTHER PUBLICATIONS

"Evolution of an Imaginitive Technology—Double Wall Blow Molding", J. Rathgeber from Blow Molding Handbook, edited by Rosato et al, pp. 827-828, 1989, Oxford University Press.*

Washimi, T.; WPI, Thomson Scientific, vol. 1994, No. 28, Database accession No. 1994-230403, XP002755697 1,8,12-15 * paragraphs [0009] -[0010] *; Bibliographic data retrieved from EPO.

European extended search report issued in European Application No. 15188596.9; date mailed Apr. 1, 2016 (8 pgs).

* cited by examiner

BLOW MOLDED AIRFLOW CONDUIT WITH OUTER INSULATION

FIELD

The present disclosure relates in general to airflow conduits, and more particularly to a blow molded airflow conduit for a motor vehicle, which includes outer insulation to increase thermal efficiency and/or noise attenuation characteristics of the blow molded airflow conduit.

BACKGROUND

Airflow conduits within motor vehicles may be used to circulate air as part of the heating, ventilation and air-conditioning (HVAC) system. The airflow conduits may be used to circulate heated or cooled air to various locations within the motor vehicle. For example, exemplary airflow conduits may be arranged beneath the instrument panel, center console, the floor carpet or the roof headliner. Such airflow conduits may direct airflow towards the windshield, footwells, seats and otherwise throughout the passenger compartment. The air may be fresh (ambient) air from outside of the vehicle, recirculated air from within the vehicle or a combination thereof.

Airflow conduits may be blow molded from a thermoplastic composition. While blow molded airflow conduits are relatively inexpensive to produce, the blow molded airflow conduits may exhibit certain drawbacks.

The blow molded airflow conduits may suffer from relatively low thermal efficiency, such that the heated or cooled air being transmitted therein may substantially decrease or increase in temperature, respectively, before the air reaches the passenger compartment. The blow molded airflow conduit may also vibrate and/or contact against other motor vehicle components during operation of the vehicle, which may result in squeaking, rattling or other unwanted noise.

In order to reduce unwanted noise with adjacent components, a localized foam element may be glued onto the blow molded airflow conduit at a location indicative of the source of unwanted noise, such as at a location where the blow molded airflow conduit may make contact with another component (e.g. rub against) when the vehicle is being operated.

In order to increase thermal efficiency, particularly at the inlet and/or outlet to the blow molded airflow conduit where the conduit may mate with another component, the mating edge of the blow molded airflow conduit may include a localized foam seal intended to seal the connection formed between the mating components to inhibit airflow losses. Similar to the foam element used for noise attenuation, the foam seal may be glued to the blow molded thermoplastic airflow conduit with a separate adhesive. In both instances, the adhesive may be a hot-melt adhesive or a pressure sensitive adhesive.

Unfortunately, while the use of a foam seal particularly only at locations where the blow molded airflow conduit mates with other components may reduce airflow losses, such does not address the thermal losses encountered by air as it flows along the length of the blow molded airflow conduit.

Furthermore, the use of an adhesive to glue the foam seal or other foam element to the blow molded airflow conduit is problematic, in that the bond may degrade over time and ultimately fail.

SUMMARY

The present disclosure provides airflow conduits, and more particularly a blow molded airflow conduit which may include outer insulation to increase thermal efficiency and/or noise attenuation characteristics of the blow molded airflow conduit, which may include, for example, noise suppression and/or noise absorption.

The thermal and/or sound insulation is attached to the blow molded airflow conduit during the blow molding process, such that the insulation is directly bonded to the blow molded airflow conduit without a need for separate adhesive to bond the insulation thereto.

Furthermore, the blow molding process enables a substantial portion of the blow molded airflow conduit to be covered with thermal and/or sound insulation, thus increasing the thermal efficiency of the blow molded airflow conduit, as well as noise attenuation.

In at least one embodiment of the disclosure, a method of forming a blow molded plastic article is provided, with the method comprising providing an insulation carrier; providing a first sheet of insulation material located on the insulation carrier; providing a blow molding mold, the blow molding mold including two halves and having a molding surface defining a molding cavity to form the blow molded plastic article, wherein the blow molded plastic article comprises a blow molded airflow conduit; locating the insulation carrier between the two halves of the blow molding mold; transferring the first sheet of insulation material from the insulation carrier to the blow molding mold such that the first sheet of insulation material overlies at least a first portion of the molding surface of the blow molding mold; introducing an extrudate of thermoplastic composition between the two halves of the blow molding mold; closing the blow molding mold; forming the extrudate to a shape of the mold cavity of the blow molding mold to form the blow molded plastic article; bonding the extrudate to the first sheet of insulation material overlying at least a portion of the mold surface of the blow molding mold as the extrudate is being formed to the shape of the mold cavity; and forming at least one air inlet and at least one air outlet in the blow molded airflow conduit.

In at least one embodiment of the disclosure, the first sheet of insulation material is retained on the insulation carrier by vacuum.

In at least one embodiment of the disclosure, the insulation carrier comprises a first insulation carrying mandrel; and providing a first sheet of insulation material located on the insulation carrier further comprises forming the first sheet of insulation material on the first insulation carrying mandrel.

In at least one embodiment of the disclosure, forming the first sheet of insulation material on the first insulation carrying mandrel further comprises vacuuming forming the first sheet of insulation material on the first insulation carrying mandrel.

In at least one embodiment of the disclosure, forming the first sheet of insulation material on the first insulation carrying mandrel further comprises forming the first sheet of insulation material on the first insulation carrying mandrel from a first planar sheet of insulation material to a first three-dimensional preform of a first portion of the blow molded airflow conduit.

In at least one embodiment of the disclosure, forming the first sheet of insulation material on the first insulation carrying mandrel is performed after heating the first sheet of insulation material.

In at least one embodiment of the disclosure, transferring the first sheet of insulation material from the insulation carrier to the blow molding mold includes moving at least one of the blow molding mold halves towards the insulation carrier; providing the at least one blow molding mold half which moves towards the insulation carrier with vacuum; and using the vacuum of the at least one blow molding mold half which moves towards the insulation carrier to remove the first sheet of insulation material from the insulation carrier and retain the first sheet of insulation material on the at least one blow molding mold half of the blow mold.

In at least one embodiment of the disclosure, transferring the first sheet of insulation material from the insulation carrier to the blow molding mold includes moving the insulation carrier towards at least one of the blow molding halves; providing the at least one blow molding mold half which the insulation carrier moves towards with vacuum; and using the vacuum of the at least one blow molding mold half which the insulation carrier moves towards to remove the first sheet of insulation material from the insulation carrier and retain the first sheet of insulation material on the at least one blow molding mold half.

In at least one embodiment of the disclosure, the method may further comprise providing a second sheet of insulation material located on the insulation carrier.

In at least one embodiment of the disclosure, the second sheet of insulation material is retained on the insulation carrier by vacuum.

In at least one embodiment of the disclosure, the insulation carrier comprises a first insulation carrying mandrel and a second insulation carrying mandrel; and providing a first sheet of insulation material located on the insulation carrier further comprises forming the first sheet of insulation material on the first insulation carrying mandrel; and providing a second sheet of insulation material located on the insulation carrier further comprises forming the second sheet of insulation material on the second insulation carrying mandrel.

In at least one embodiment of the disclosure, forming the first sheet of insulation material on the first insulation carrying mandrel further comprises vacuuming forming the first sheet of insulation material on the first insulation carrying mandrel; and forming the second sheet of insulation material on the second insulation carrying mandrel further comprises vacuuming forming the second sheet of insulation material on the second insulation carrying mandrel.

In at least one embodiment of the disclosure, forming the first sheet of insulation material on the first insulation carrying mandrel further comprises forming the first sheet of insulation material on the first insulation carrying mandrel from a first planar sheet of insulation material to a first three-dimensional preform of at least a first portion of the blow molded airflow conduit; and forming the second sheet of insulation material on the second insulation carrying mandrel further comprises forming the second sheet of insulation material on the second insulation carrying mandrel from a second planar sheet of insulation material to a second three-dimensional preform of at least a second portion of the blow molded airflow conduit.

In at least one embodiment of the disclosure, forming the first sheet of insulation material on the first insulation carrying mandrel is performed after heating the first sheet of insulation material; and forming the second sheet of insulation material on the second insulation carrying mandrel is performed after heating the second sheet of insulation material.

In at least one embodiment of the disclosure, transferring the second sheet of insulation material from the insulation carrier to the blow molding mold such that the second sheet of insulation material overlies at least a second portion of the molding surface of the blow molding mold.

In at least one embodiment of the disclosure, transferring the first sheet and the second sheet of insulation material to the blow molding mold includes moving the blow molding mold halves towards the insulation carrier; providing each blow molding mold half with vacuum; using the vacuum of one of the blow molding mold halves to remove the first sheet of insulation material from the insulation carrier and retain the first sheet on the one blow molding mold half of the blow mold; and using the vacuum of the other of the blow molding mold halves to remove the second sheet of insulation from the insulation carrier and retain the second sheet on the other blow molding mold half of the blow mold.

In at least one embodiment of the disclosure, transferring the first sheet and the second sheet of insulation material to the blow molding mold includes moving the insulation carrier towards each of the blow mold halves; providing each blow molding mold half with vacuum; using the vacuum of one of the blow molding mold halves to remove the first sheet of insulation material from the insulation carrier and retain the first sheet on the one blow molding mold half of the blow mold; and using the vacuum of the other of the blow molding mold halves to remove the second sheet of insulation from the insulation carrier and retain the second sheet on the other blow molding mold half of the blow mold.

In at least one embodiment of the disclosure, bonding the extrudate to the second sheet of insulation material overlying at least a second portion of the mold surface of the blow molding mold as the extrudate is being formed to the shape of the mold cavity.

In at least one embodiment of the disclosure, the first sheet of insulation material forms an exposed outer layer of the blow molded airflow conduit.

In at least one embodiment of the disclosure, the extrudate forms at least one inner layer beneath the outer layer of the blow molded airflow conduit; and the at least one inner layer defines an airflow passage of the blow molded airflow conduit.

FIGURES

The above-mentioned and other features of this disclosure, and the manner of attaining them, will become more apparent and better understood by reference to the following description of embodiments described herein taken in conjunction with the accompanying drawings, wherein.

Figure 1:
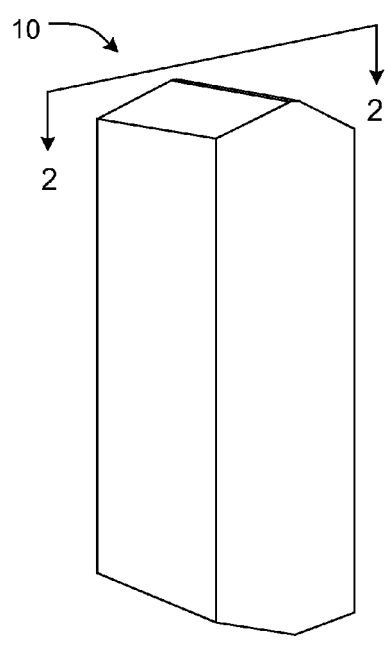
FIG. 1 is a perspective view of a blow molded airflow conduit according to the present disclosure.
Figure 11:
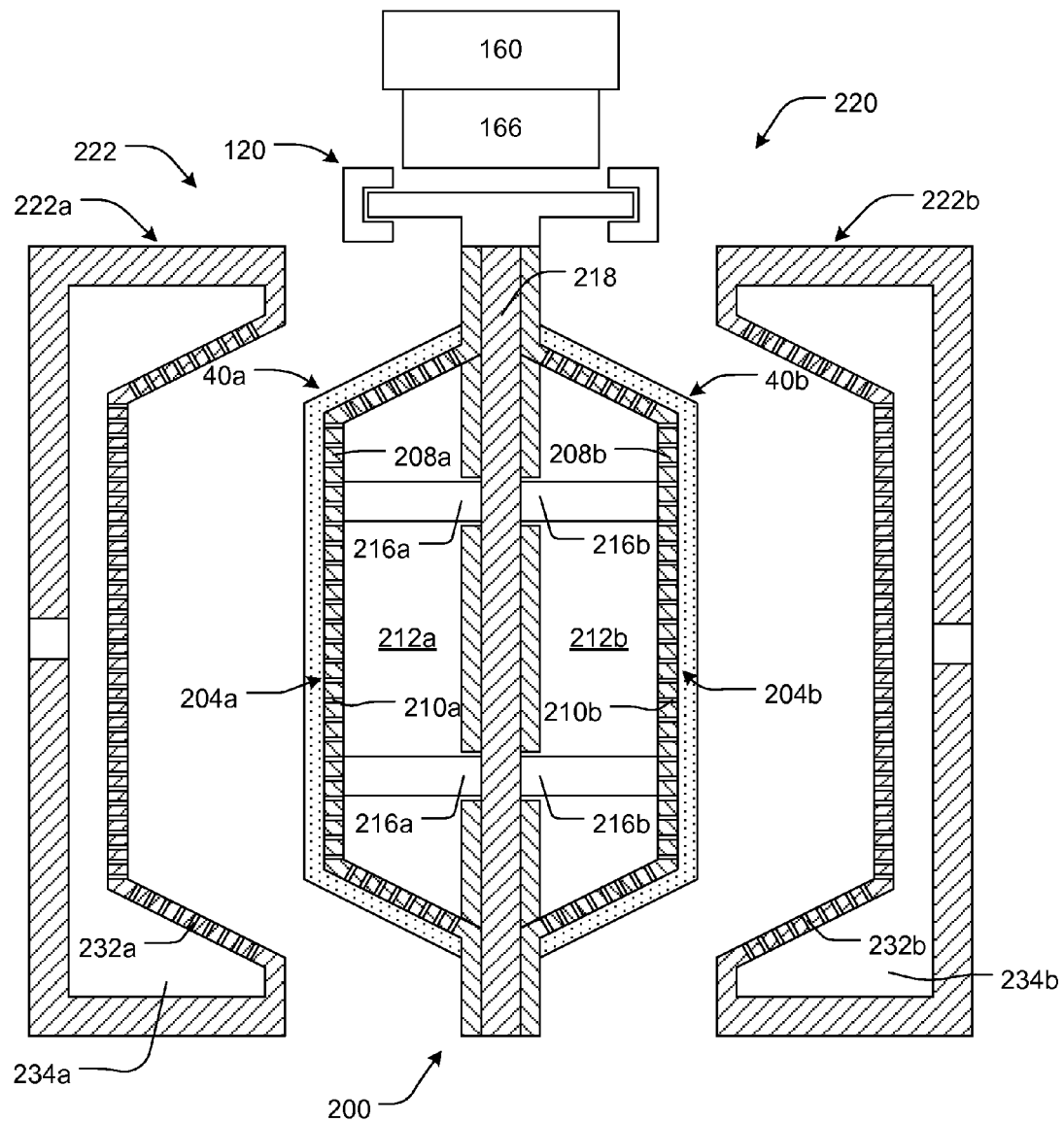
Figure 12:
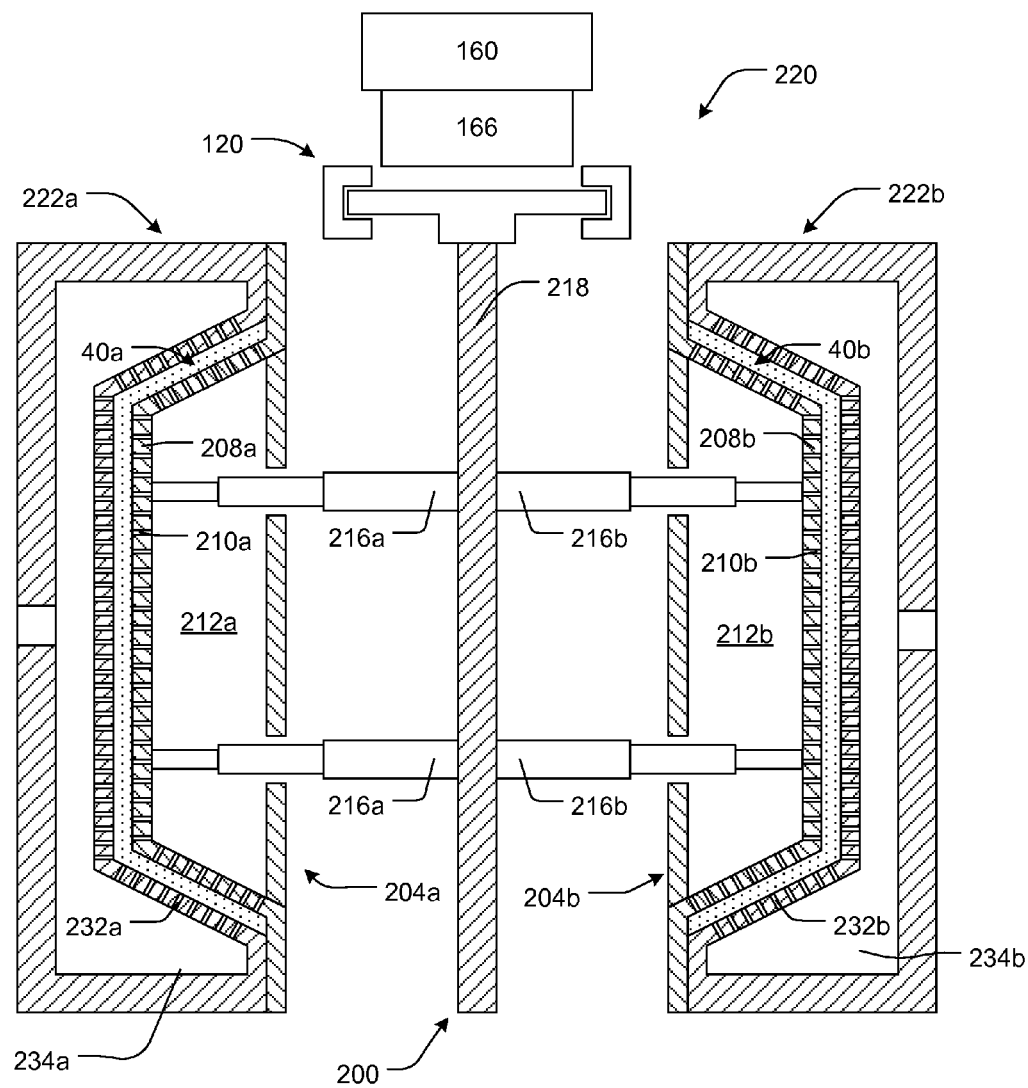

FIG. 11 is a cross-sectional view of the preformed sheets of insulation material on a second embodiment of the insulation carrier, within the confines of the opened blow mold, with the insulation carrying mandrels retracted, and with the cross-sectional view taken in the direction of line 2-2 of FIG. 1; and FIG. 12 is a cross-sectional view of a the preformed sheets of insulation material on the second embodiment of the insulation carrier, within the confines of the opened blow mold, with the insulation carrying mandrels extended, and with the cross-sectional view taken in the direction of line 2-2 of FIG. 1.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 2:
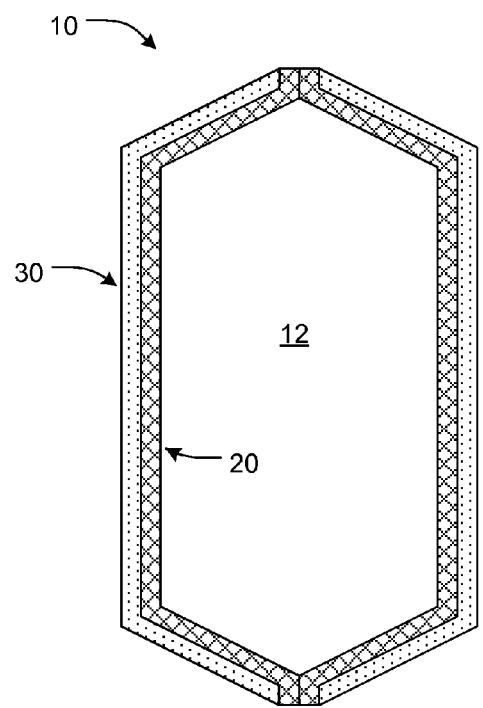
FIG. 2 is a cross-sectional view of the blow molded airflow conduit taken in the direction of line 2-2 of FIG. 1.

Referring to FIGS. 1 and 2, there is shown a molded plastic article 10 according to the present disclosure, and more particularly an exemplary blow molded plastic article in the form of an elongated airflow conduit. The molded plastic article 10 may comprise an exposed outer (thermal and/or sound) insulation layer 30, and an inner substrate layer 20, which defines an airflow passage 12 of the conduit, beneath the outer insulation layer 30.

Figure 3:
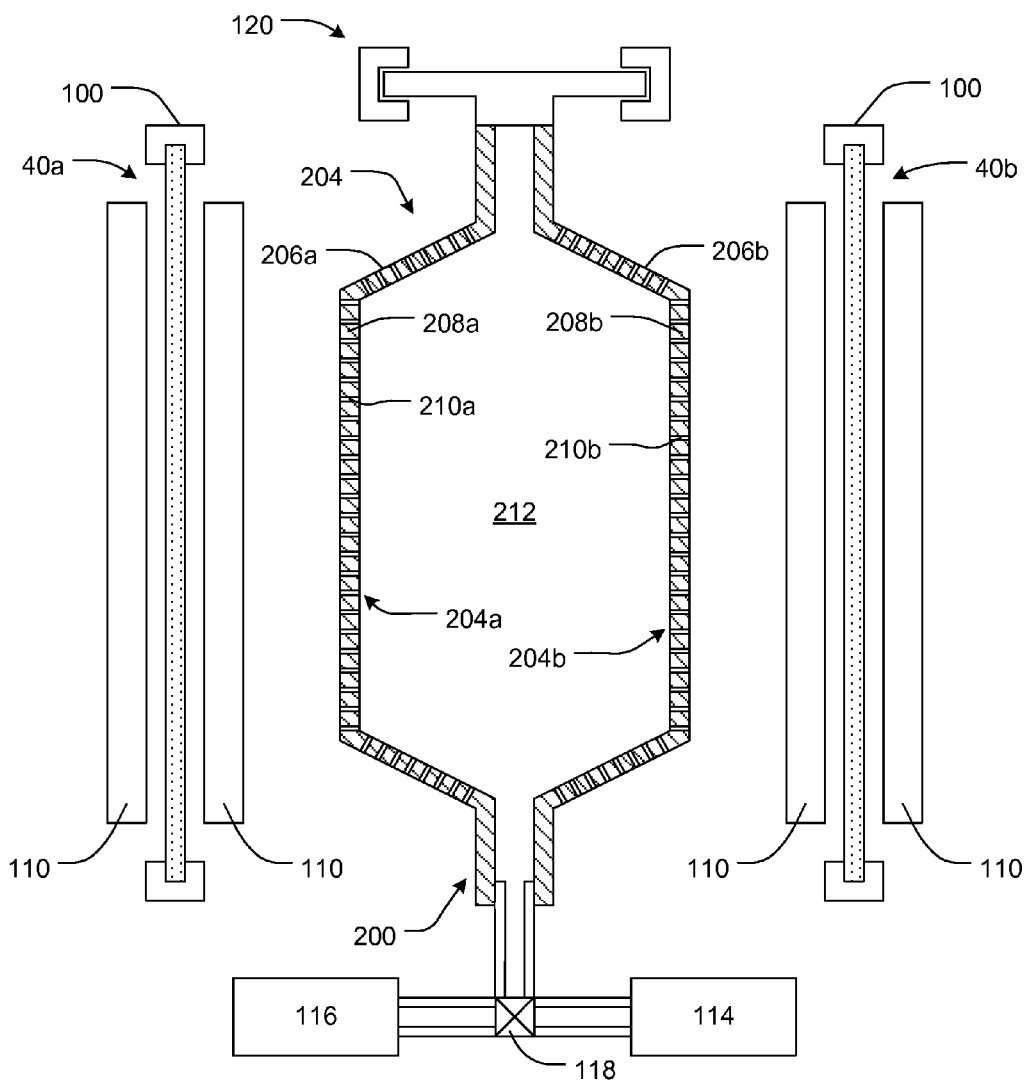
FIG. 3 is a cross-sectional view of an insulation carrier and planar sheets of insulation material, with the cross-sectional view taken in the direction of line 2-2 of FIG. 1.

Referring now to FIG. 3, molded plastic article 10 may be formed by first shaping the outer insulation layer 30. Outer insulation layer 30 may be formed in a three-dimensional shape, from one or more sheets of insulating material 40a, 40b which may be planar (i.e. two-dimensional), such as flat blanks cut from roll-stock.

As shown, two sheets of insulating material 40a, 40b are used to form the outer insulation layer 30, with the sheets of insulating material 40a, 40b arranged to be on opposing sides of the molded plastic article 10 after it is formed. The sheets of insulating material 40a, 40b may be held in perimeter retention frames 100 and heated with a heating source 110, such as an infrared heater, on one or both sides thereof.

Thereafter, heating source 110 may be removed, and the sheets of insulating material 40a, 40b may be moved towards a first tool 200 centrally located there between. However, it should be understood that heating of the sheets of insulating material 40a, 40b prior to forming may not be required in all instances, and will depend on the composition of the insulating material 40a, 40b, as well as the geometry of the molded plastic article 10.

As shown, first tool 200 may comprise insulation carrier 204 which comprises first and second insulation carrying mandrels 204a, 204b, which comprises first and second insulation support surfaces 206a, 206b provided by insulation support walls 208a, 208b. First and second insulation carrying mandrels 204a, 204b may further comprise a plurality of air passages 210a, 210b which extend through the by insulation support walls 208a, 208b of the first and second mandrels 204a, 204b from the first and second insulation support surfaces 206a, 206b to an internal air chamber 212 located within the insulation carrier 204. The internal air chamber 212 may be coupled (in fluid communication) to a vacuum (negative air pressure) source 114 or a compressed gas (positive pressure) source 116 by operation of valve 118.

Figure 4:
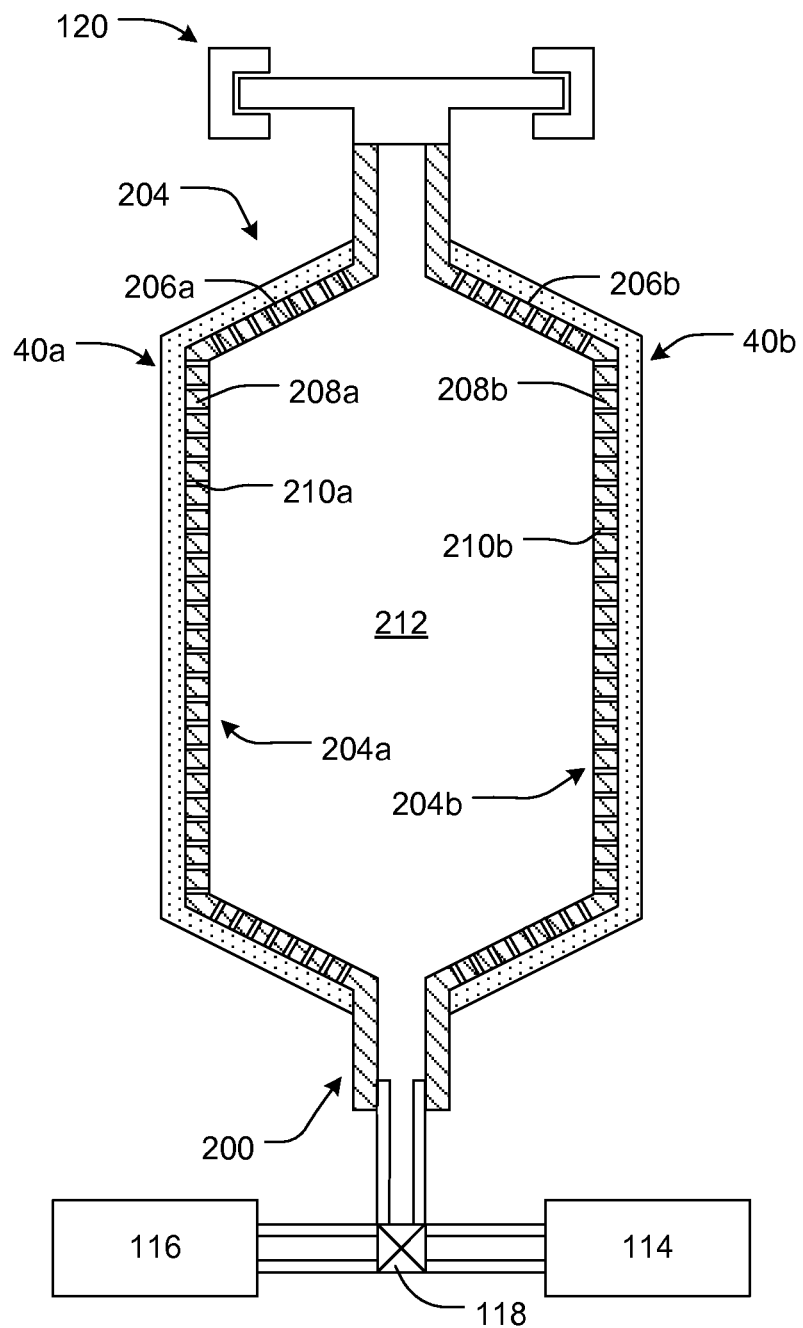
FIG. 4 is a cross-sectional view of the insulation carrier and preformed sheets of insulation material on the insulation carrier, with the cross-sectional view taken in the direction of line 2-2 of FIG. 1.

Referring now to FIG. 4, in certain embodiments, it may be desirable to preform the sheets of insulating material 40a, 40b to a three-dimensional shape approximating that of the molded plastic article 10 on the insulation carrier 204. In order to form the sheets of insulating material 40a, 40b to a three-dimensional shape approximating that of the molded plastic article 10, vacuum may be applied through air passages 210a, 210b while internal air chamber 212 is in fluid communication with vacuum source 114 such that the sheets of insulating material 40a, 40b are vacuum-formed over and onto insulation carrier 204 and conform to the shape of the first and second insulation support surfaces 206a, 206b and support walls 208a, 208b of the first and second carrying mandrels 204a, 204b.

It should be understood that preforming of the sheets of insulating material 40a, 40b to a three-dimensional shape approximating that of the molded plastic article 10 may not be performed on the insulation carrier 204 in all instances. For example, the sheets of insulating material 40a, 40b may be preformed to a three-dimensional shape prior to being loaded on the insulation carrier 204, in which case the insulation carrier 204 may or may not provide additional forming to the preformed sheets of insulating material 40a, 40b.

Figure 5:
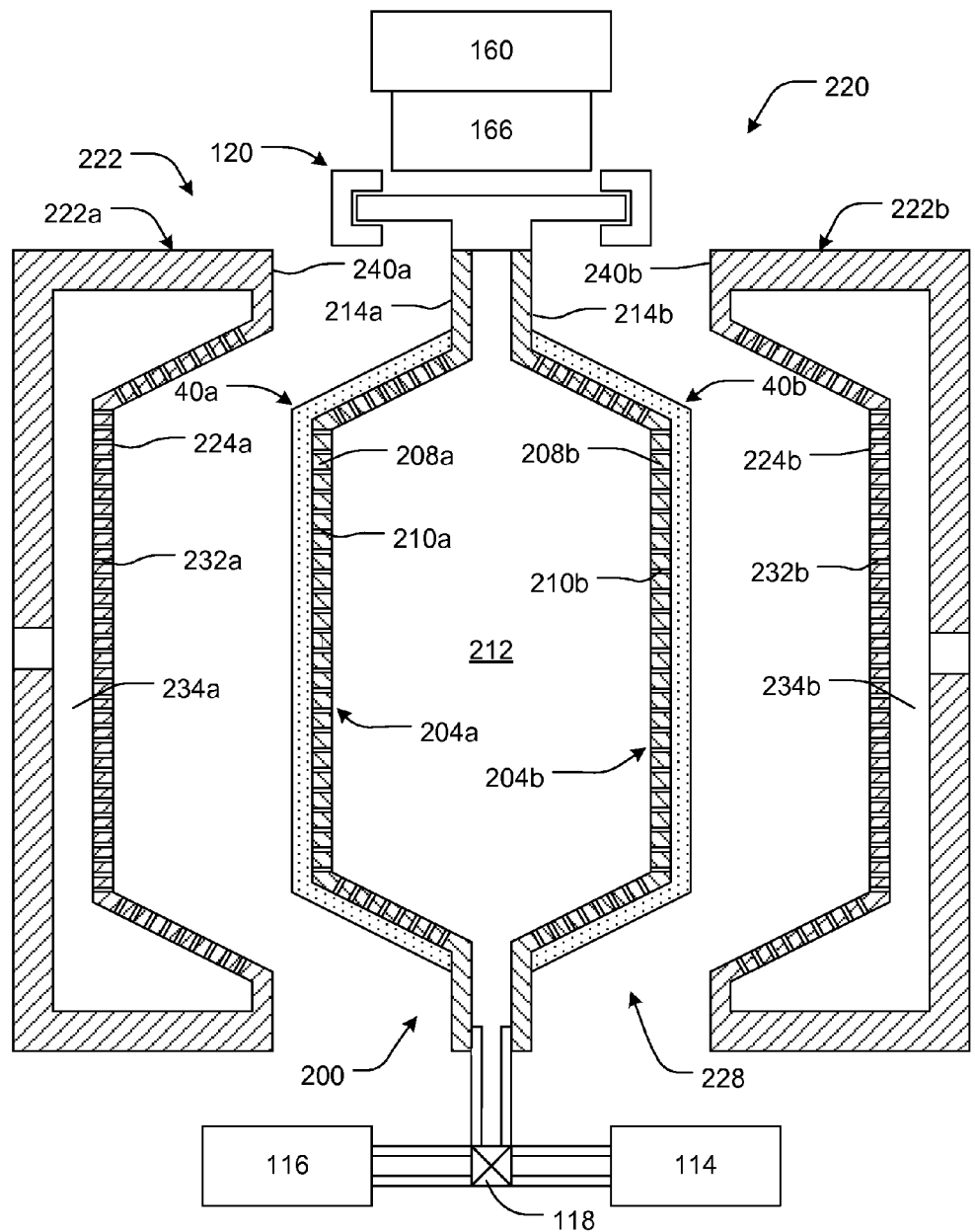
FIG. 5 is a cross-sectional view of the preformed sheets of insulation material on the insulation carrier within the confines of an opened blow mold, with the cross-sectional view taken in the direction of line 2-2 of FIG. 1.

Thereafter, as shown in FIG. 5, the insulation carrier 204 may be moved on a rail 120 from the insulation loading/forming station to a molding station, and particularly within the confines of a second tool 220. As shown, second tool 220 may comprise a blow mold 222, which comprises opposing mold halves 222a, 222b.

Figure 6:
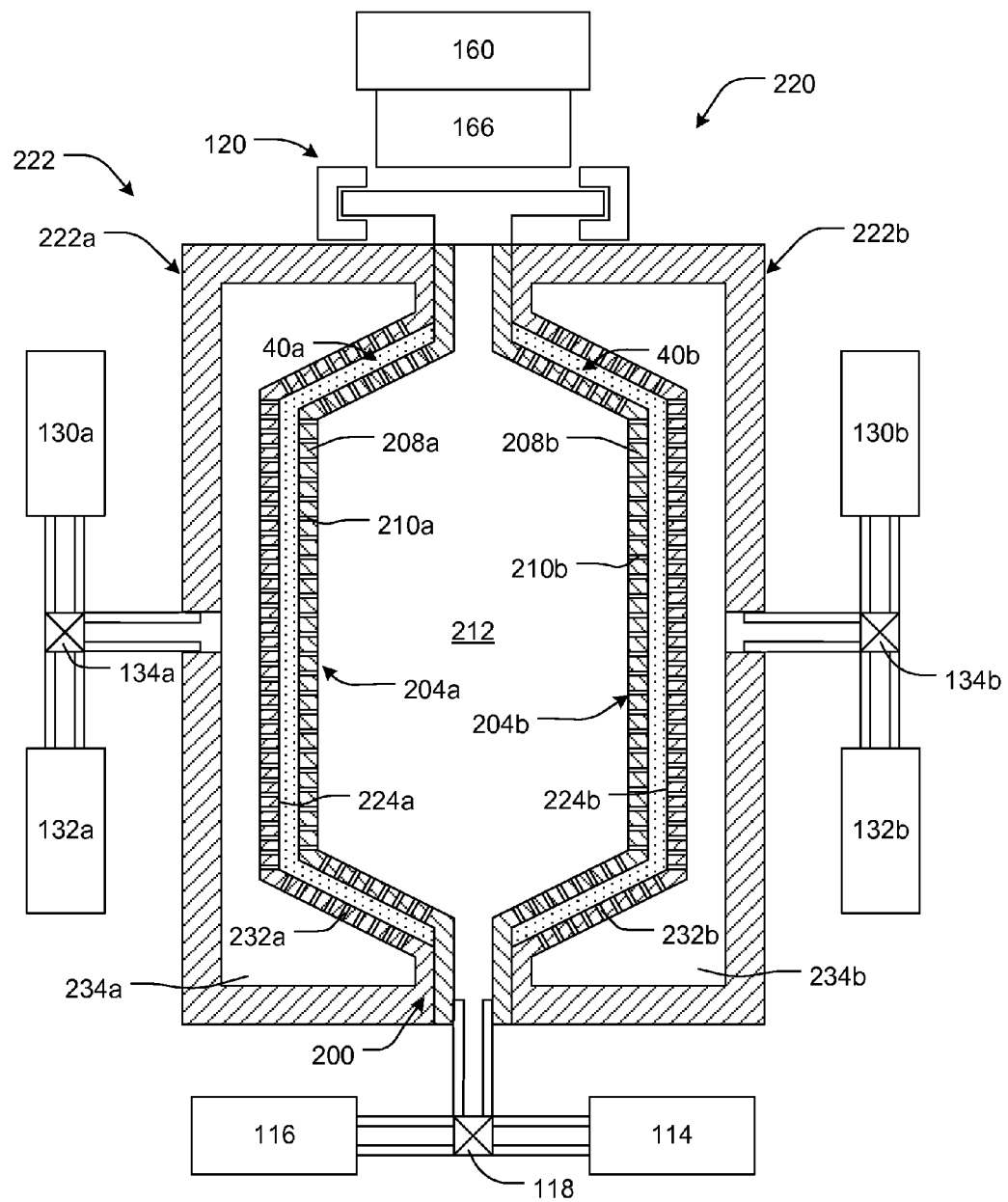
FIG. 6 is a cross-sectional view of the preformed sheets of insulation material on the insulation carrier within the confines of the blow mold after the blow mold has been closed, with the cross-sectional view taken in the direction of line 2-2 of FIG. 1.

As shown, blow mold halves 222a, 222b may each comprise a blow mold surface halves 224a, 224b, respectively, which define an internal molding cavity 228. As shown, each blow mold half 222a, 222b further comprise a plurality of air passages 232a, 232b which extend through the blow mold halves 222a, 222b from the surface halves 224a, 224b to internal air chambers 234a, 234b located within the blow mold halves 222a, 222b. As shown in FIG. 6, internal air chambers 234a, 234b may be coupled (in fluid communication) to a vacuum (negative air pressure) source 130a, 130b or a compressed air (positive air pressure) source 132a, 132b by operation of valve 134a, 134b.

With reference now to FIGS. 5 and 6, once the insulation carrier 204 is properly located between blow mold halves 222a, 222b, the blow mold halves 222a, 222b may be closed until the parting surfaces 240a, 240b of the blow mold halves 222a, 222b contact the parting surfaces 214a, 214b on the insulation carrier 204.

Once the blow mold halves 222a, 222b are closed as set forth above, vacuum may be drawn through air passages 232a, 232b while internal air chambers 234a, 234b are in fluid communication with vacuum sources 130a, 130b. At the same time, if negative air pressure is still being applied to the insulation carrier 204, the vacuum being drawn through air passages 210a, 210b may be terminated.

In such manner, with the change in vacuum from the insulation carrier 204 to the blow mold halves 222a, 222b, the preformed sheets of insulating material 40a, 40b may be transferred from being retained by the first and second insulating carrying mandrels 204a, 204b to being retained by the blow mold halves 222a, 222b. Moreover, to further aid the transfer of the preformed sheets of insulating material 40a, 40b from the insulation carrier 204 to the blow mold 222, positive air pressure (greater than ambient) may be applied to the insulation carrier 204.

Alternatively, rather than terminating the vacuum applied to the insulation carrier 204, the vacuum applied through the blow mold halves 222a, 222b may be greater than the vacuum applied to the insulation carrier 204, in which case the vacuum associated with both the insulation carrier 204 and the blow mold halves 222a, 222b may not have to be turned off during the molding cycle.

Figure 7:
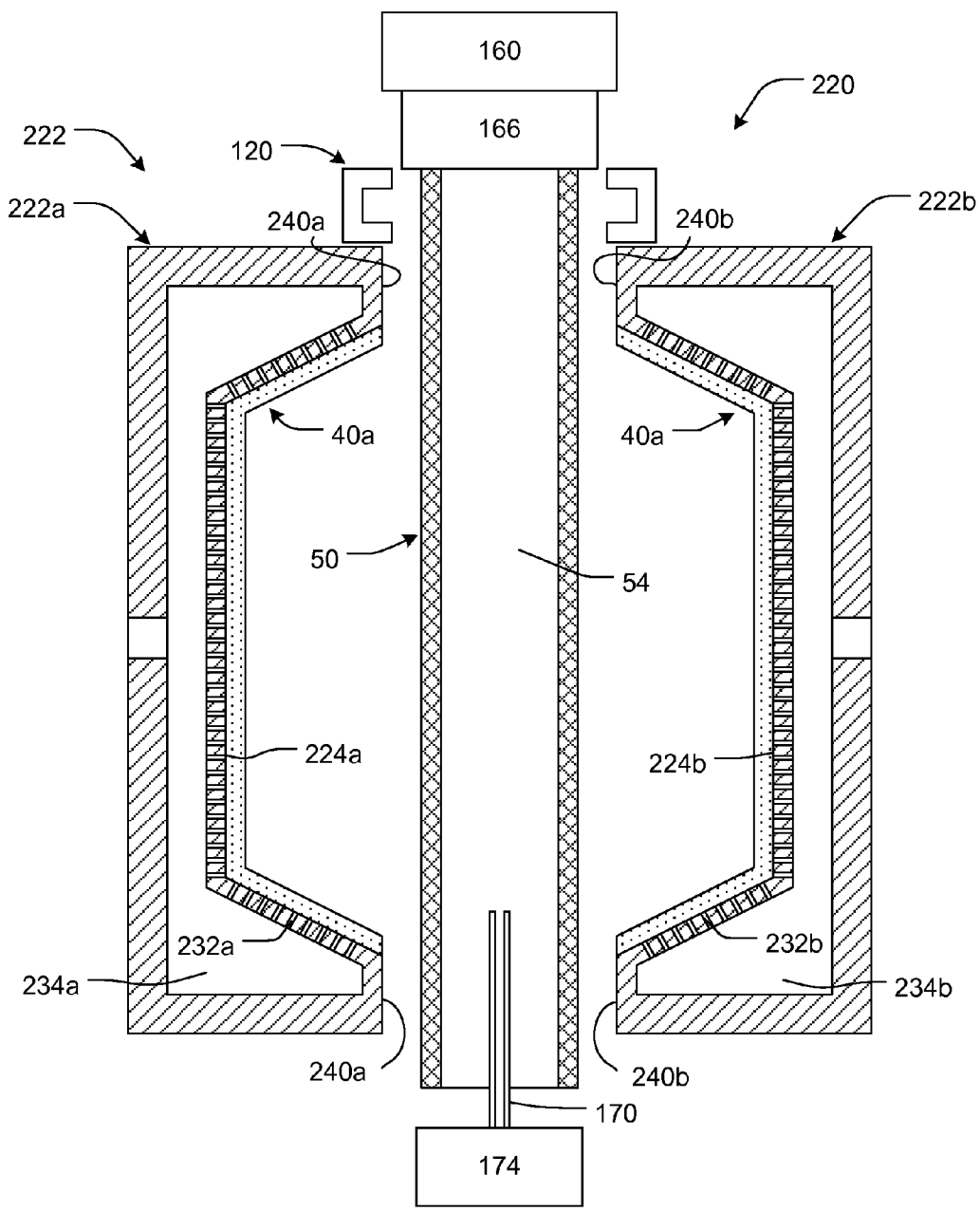
FIG. 7 is a cross-sectional view of the preformed sheets of insulation material in the blow mold, which has been opened, and an extrudate in the form of an unblown parison (with the distal end of the parison open) within the confines of the blow mold, with the cross-sectional view taken in the direction of line 2-2 of FIG. 1.

Referring now to FIG. 7 once the preformed sheets of insulating material 40a, 40b have been transferred to the blow mold halves 222a, 222b, the blow mold halves 222a, 222b may be opened, and the insulation carrier 204 removed from the blow mold 222 on rail 120 and returned to the insulation loading/forming station.

Thereafter, an extruder 160 may be used to provide an extrudate 50 from an extrusion die 166 located above and between the mold halves 222a, 222b. More particularly, as shown in FIG. 7, the extrudate 50 may be in the form of a cylindrical parison which is extruded between mold halves 222a, 222b. Vacuum source 130a, 130b, compressed air source 132a, 132b and valves 134a, 134b are not shown in FIG. 7 for clarity.

Figure 8:
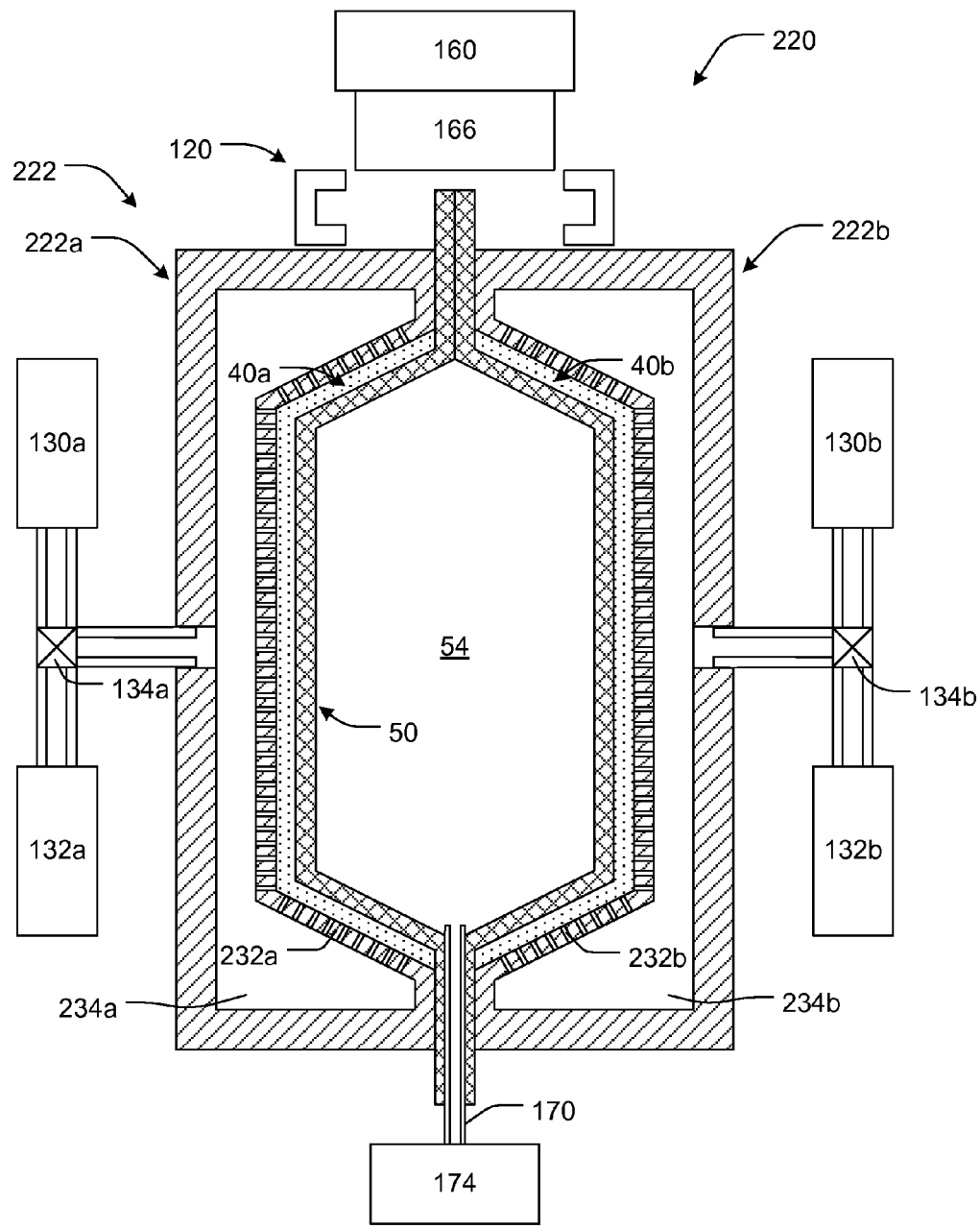
FIG. 8 is a cross-sectional view of the preformed sheets of insulation material in the blow mold, which has been closed, and the extrudate/parison expanded (blown) to the shape of the blow molded airflow conduit and bonded to the preformed sheets of insulation material, with the cross-sectional view taken in the direction of line 2-2 of FIG. 1.

Referring now to FIG. 8, once the extrudate 50 has reached the bottom of the mold halves 222a, 222b, the blow mold halves 222a, 222b may be closed such that the mold parting surfaces 240a, 240b seal against the extrudate/parison 50. At the bottom end of the mold 222, a blow pin 170 in fluid communication with a pressurized gas source 174 may be inserted into the interior 54 of the extrudate/parison 50 before the mold closes. Once the mold has closed, compressed gas from gas source 174 may enter the interior of the extrudate/parison 50 and inflate the extrudate/parison 50 such that the extrudate/parison 50 takes the shape of the molding cavity 228 and melt bonds/welds to the preformed sheets of insulation material 40a, 40b, by virtue of the extrudate/parison 50 being in a melt state, to form the inner substrate layer 20 of the molded plastic article 10. After cooling for a suitable time, the blow mold 222 may be opened and the molded plastic article 10 removed from the mold 222.

Figure 9:
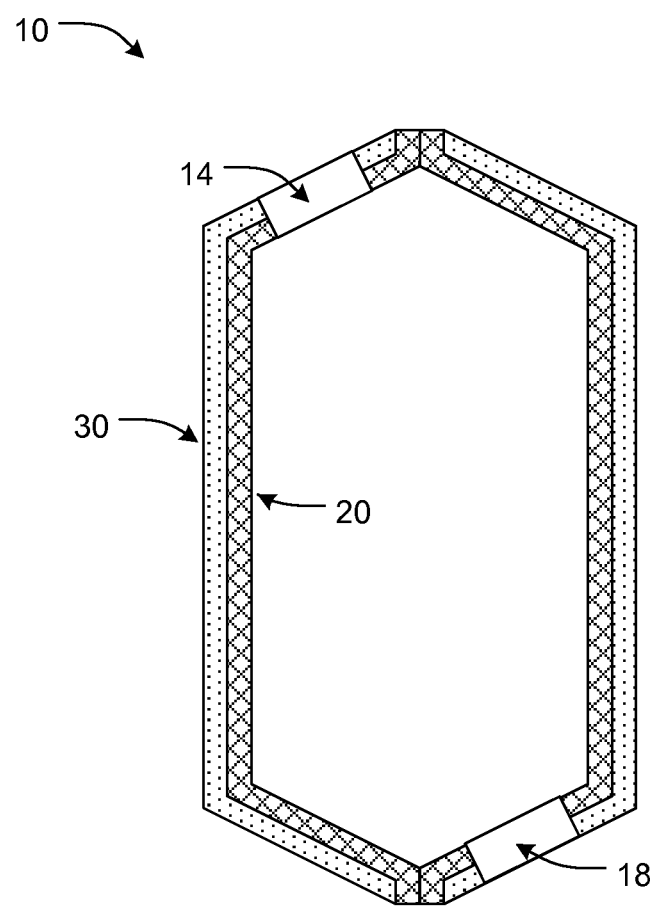
FIG. 9 is a cross-sectional view of the blow molded airflow conduit taken in the direction of line 2-2 of FIG. 1, taken after trimming and forming an airflow inlet and an airflow outlet therein.

Referring now to FIG. 9, after being removed from the mold 222, the molded plastic article/blow molded airflow conduit 10 may be trimmed, including the forming of an airflow inlet 14 and airflow outlet 18 therein, which extends through the inner substrate layer 20 and an outer (thermal and/or sound) insulation layer 30. Airflow inlet 14 and airflow outlet 18 may be formed by mechanical cutting, laser, water jet or other suitable trimming device.

As shown by FIGS. 1, 2 and 9, by performing the sheets of insulating material 40a, 40b to a three-dimensional shape approximating that of the molded plastic article 10, the a molded plastic article 10 may be produced with the insulating layer 30 which substantially covers the entire surface area, i.e. at least 95% of the surface area, of the molded plastic article 10 with insulation material. The insulating layer 30 may be used to cover substantially all of the surface area of the molded plastic article 10 to provide the greatest thermal and/or sound insulation to the molded plastic article 10. However, it should be understood that while the greatest thermal and/or sound insulation for the molded plastic article 10 may be achieved when the insulating layer 30 substantial covers the entire surface area of the molded plastic article 10, depending on application, the insulating layer 30 may not have to substantial cover the entire surface area of the molded plastic article 10 to achieve its objectives. Thus, the sheets insulating layer 30 may cover, for example at least 50%, at least 50% 60%, at least 70%, at least 80%, or at least 90% of the surface area of the molded plastic article 10. For example, it may be plausible in certain embodiments that only half of the molded plastic article 10 is covered with outer insulation layer 30, in which case only one of the sheets of insulating material 40a, 40b may be required.

Figure 10:
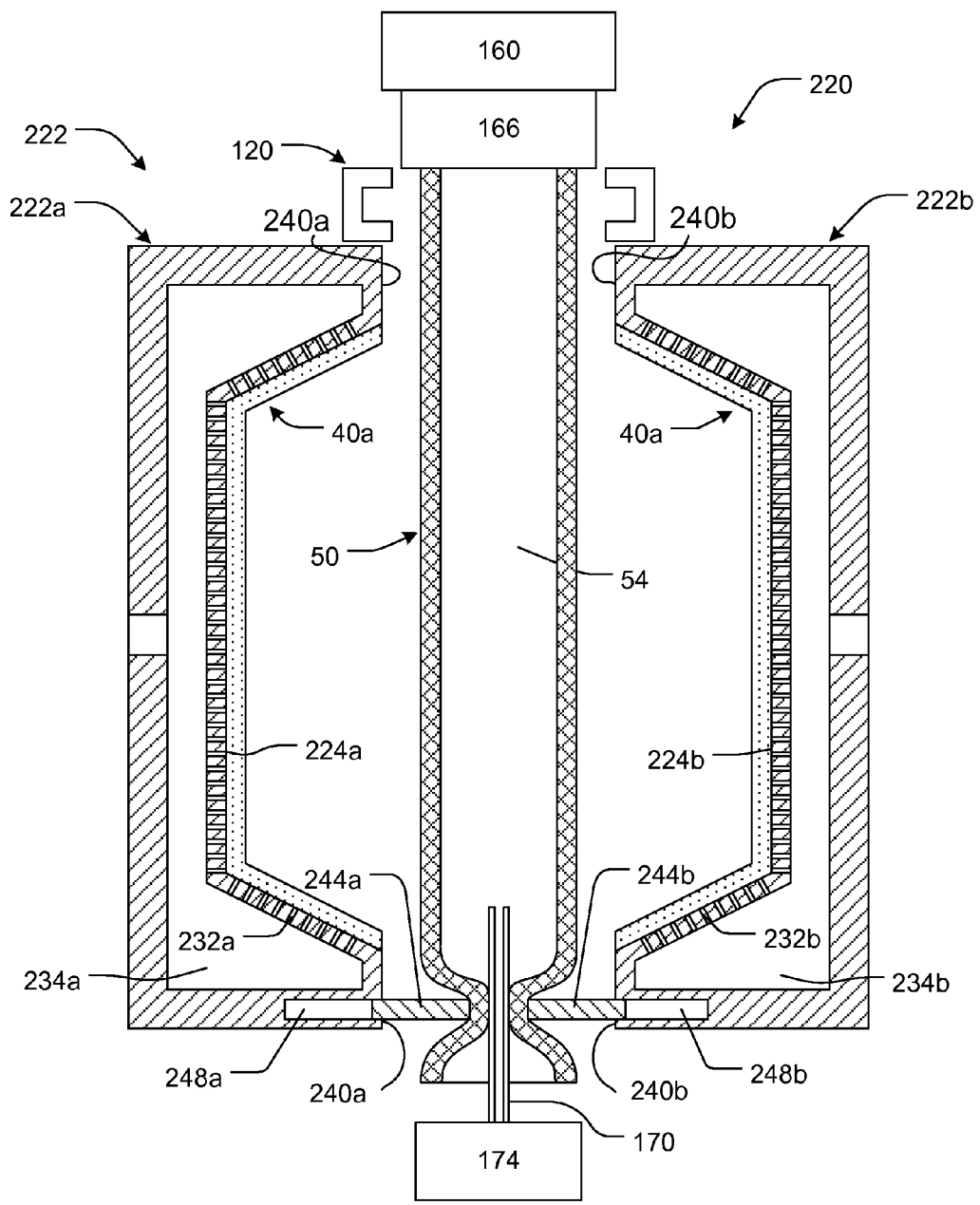
FIG. 10 is a cross-sectional view of the preformed sheets of insulation material in the blow mold, which is opened, and an extrudate in the form of an unblown parison (with the distal end of the parison closed) within the confines of the blow mold, with the cross-sectional view taken in the direction of line 2-2 of FIG. 1.

Referring now to FIG. 10, in an alternative embodiment, each of the mold halves 222a, 222b of blow mold 222 may include an extendable/retractable parison sealing member 244a, 244b, which co-operate with one another to seal against the extrudate/parison 50 before the blow mold 222 closes. As shown, once the distal end of the extrudate/parison 50 passes the bottom end of mold 222, the parison sealing members 244a, 244b may be extended to seal against the extrudate/parison 50, at which time compressed gas from gas source 174 may enter the interior of the extrudate/parison 50 and at least partially inflate the extrudate/parison 50 before the blow mold 222 closes. As the blow mold 222 closes, the parison sealing members 244a, 244b may then retract into receptacles 248a, 248b.

Referring now to FIG. 11, there is shown a cross-sectional view of a the preformed sheets of insulation material 40a, 40b on a second embodiment of the insulation carrier 204 within the confines of the opened blow mold halves 222a, 222b of blow mold 222. In contrast to the first embodiment, first and second insulation carrying mandrels 204a, 204b of insulation carrier 204 are extendable and retractable on pneumatic pistons 216a, 216b mounted between the first and second insulation carrying mandrels 204a, 204b and a center support member 218.

With the foregoing arrangement, vacuum may first be applied through air passages 210a, 210b while internal air chambers 212a, 212b are in fluid communication with vacuum source 114 such that the sheets of insulating material 40a, 40b are vacuum-formed over and onto insulation carrier 204 and conform to the shape of the first and second insulation support surfaces 206a, 206b.

Thereafter, once the insulation carrier 204, including the preformed sheets of insulating material 40a, 40b, is properly located between blow mold halves 222a, 222b, the pneumatic pistons 216a, 216b may be extended to extend the first and second insulation carrying mandrels of the insulation carrier 204 towards blow mold halves 222a, 222b of the blow mold 222 until the parting surfaces 214a, 214b on the insulation carrier 204 make contact with the parting surfaces 240a, 240b of the blow mold halves 222a, 222b.

Once the first and second insulation carrying mandrels 204a, 204b of the insulation carrier 204 have been extended as set forth above, vacuum may be drawn through air passages 232a, 232b of the blow mold halves 222a, 222b of the blow mold 222 while internal air chambers 234a, 234b are in fluid communication with vacuum sources 130a, 130b. At the same time, if vacuum is still being applied to the insulation carrier 204, the vacuum being drawn through air passages 210a, 210b may be terminated.

In such manner, with the change in vacuum from the insulation carrier 204 to the blow mold halves 222a, 222b, the preformed sheets of insulating material 40a, 40b may be transferred from being retained by the first and second insulation carrying mandrels 204a, 204b to being retained by the blow mold halves 222a, 222b. Moreover, to further aid the transfer of the preformed sheets of insulating material 40a, 40b from the insulation carrier 204 to the blow mold 222, positive air pressure (greater than ambient) may be applied to the insulation carrier 204.

Alternatively, rather than terminating the vacuum applied to the insulation carrier 204, the vacuum applied through the blow mold halves 222a, 222b may be greater than the vacuum applied to the insulation carrier 204, in which case the vacuum associated with both the insulation carrier 204 and the blow mold halves 222a, 222b may not have to be turned off during the molding cycle.

Thereafter, the pneumatic pistons 216a, 216b may be retracted to retract the first and second insulation carrying mandrels 204a, 204b of the insulation carrier 204 towards center support member 218 thereof, and the insulation carrier 204 removed from the blow mold 222 on rail 120 and returned to the insulation loading/forming station.

Thus, rather than having the blow mold halves 222a, 222b of the blow mold 222 move towards and away from the first and second insulation carrying mandrels 204a, 204b of the insulation carrier 204 as with the first embodiment, the second embodiment enables the first and second insulation carrying mandrels 204a, 204b of the insulation carrier 204 to move towards and away from the blow mold halves 222a, 222b of the blow mold 222. Furthermore, the present embodiment also permits both the first and second insulation carrying mandrels 204a, 204b of the insulation carrier 204 and the blow mold halves 222a, 222b of the blow mold 222 to simultaneously move towards each other or away from each other in another variation of the process.

With regards to materials, the sheets of insulation material 40a, 40b forming the exposed outer (thermal and/or sound) insulation layer 30 of the molded plastic article 10 may comprise a polymer composition formed with a cellular (foam) structure, particularly by providing voids formed in the polymer (matrix) composition. The cellular structure may be formed by a blowing agent (e.g. chemical of physical) released in the polymer composition.

For noise attenuation, the polymer foam for insulation material 40a, 40b may have a closed cell content of at least 50%, and more particularly at least 65%, such as in a range of 10% to 50% or 10% to 65%. Even more particularly, the foam may have a closed cell content of up to 70%. In such a manner, air cannot flow through the material, thus creating a sound barrier. Furthermore, given that air cannot flow through the material, the material also provides a thermal insulator.

The polymer foam for the sheets of insulation material 40a, 40b may have a thickness in a range of 2 mm to 10 mm, and more particularly in a range of 3 to 6 mm. A thicker sheet may offer greater noise attenuation, but such must be balanced against greater weight and cost.

The polymer foam for the sheets of insulation material 40a, 40b may have a density in a range of 0.5 lb/ft$^3$ to 5 lbs/ft$^3$, and more particularly in a range of 1 lb/ft$^3$ to 3 lbs/ft$^3$. The density of the foam should be low to reduce weight and increase sound absorption. Furthermore, the low density of the foam enables suitable heat transfer through the foam material from the extrudate 50 to the blow mold halves 222a, 222b to cool the extrudate 50/inner substrate layer 20 such that cycle times may not be increased.

An exemplary polymer foam for insulation material 40a, 40b may particularly comprise a polyurethane foam, particularly a thermoset polyurethane foam. As exemplary urethane foam is Resilifoam® urethane LC-2 (Lok Cell) from Plastomer Corporation.

In addition to the insulation material 40a, 40b providing increased thermal efficiency and/or noise attenuation, the insulation material 40a, 40b, also provides a trap for condensate. As HVAC systems, and particularly airflow conduits, become more efficient, condensate may form on the outer surface of an airflow conduit if the air outside the airflow conduit has a high moisture (humidity/water) content and the temperature of the air in contact with the surface of the duct drops below its dew point. Condensate which forms on the surface of the airflow conduit may then flow on the airflow conduit into other parts of the motor vehicle, which may potentially result in numerous problems, such as contributing to the rusting of metal components under the instrument panel.

However, formation of the condensate, as well subsequent flow of the condensate, should the condensate form, may both be inhibited by the insulation material 40a, 40b. As such, the insulation material 40a, 40a, may be a polymer foam which does not have an outer skin, and which has an open cell content of at least 10%. More particularly, the polymer foam may have an open cell content in a range of 10% to 50%, and even more particularly in a range of 10% to 25%.

The material for the extrudate 50/inner substrate layer 20 may be a thermoplastic polymer composition having a thickness in a range of 0.5 mm to 2.5 mm, and more particularly in a range of 1 mm to 2 mm. The thermoplastic polymer may include a polyolefin (i.e. a class of polymers produced from a simple olefin (also called an alkene with the general formula CnH2n) as a monomer), which may include polypropylene (PP) and polyethylene (PE), such as high density polyethylene (HDPE). Other thermoplastics may include polyester, such as polyethylene terephthalate (PET) or polybutylene terephthalate (PBT).

In order to provide suitable rigidity, the extrudate 50/inner substrate layer 20 may be formed of a polymer composition having a flexural modulus as measured in accordance with ASTM D-790-10 of at least 125,000 psi. at room temperature (23° C.) in order for substrate to provide sufficient rigidity to support article 10. More particularly, the substrate 20 may have a flexural modulus as measured in accordance with ASTM D-790-10 in a range of 125,000-400,000 psi. at 23° C.

In addition to providing sufficient rigidity for substrate 20 of article 10, the composition for substrate 20 should also provide suitable heat resistance. As such, the substrate 20 may be formed of a polymer composition having a heat distortion temperature as measured in accordance with ASTM D-648-07 of at least 82° C. at 264 psi. More particularly, the substrate 20 may have a heat distortion temperature as measured in accordance with ASTM D-648-07 in a range of 82-110° C. at 264 psi.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A method of forming a blow molded plastic article comprising:
   providing an insulation carrier, wherein the insulation carrier comprises a first insulation carrying mandrel;
   providing a first sheet of insulation material located on the insulation carrier, wherein providing a first sheet of insulation material located on the insulation carrier comprises forming the first sheet of insulation material on the first insulation carrying mandrel after heating the first sheet of insulation material;
   providing a blow molding mold, the blow molding mold including two halves and having a molding surface defining a molding cavity to form the blow molded plastic article, wherein the blow molded plastic article comprises a blow molded airflow conduit;
   locating the insulation carrier between the two halves of the blow molding mold;
   transferring the first sheet of insulation material from the insulation carrier to the blow molding mold such that the first sheet of insulation material overlies at least a first portion of the molding surface of the blow molding mold;
   introducing an extrudate of thermoplastic composition between the two halves of the blow molding mold;
   closing the blow molding mold;
   forming the extrudate to a shape of the mold cavity of the blow molding mold to form the blow molded plastic article;
   bonding the extrudate to the first sheet of insulation material overlying at least a portion of the mold surface of the blow molding mold as the extrudate is being formed to the shape of the mold cavity;
   and forming at least one air inlet and at least one air outlet in the blow molded airflow conduit.

2. The method of claim 1 wherein:
   the first sheet of insulation material is retained on the insulation carrier by vacuum.

3. The method of claim 1 wherein:
   forming the first sheet of insulation material on the first insulation carrying mandrel further comprises vacuuming forming the first sheet of insulation material on the first insulation carrying mandrel.

4. The method of claim 1 wherein:
   forming the first sheet of insulation material on the first insulation carrying mandrel further comprises forming the first sheet of insulation material on the first insulation carrying mandrel from a first planar sheet of insulation material to a first three-dimensional preform of a first portion of the blow molded airflow conduit.

5. The method of claim 1 wherein:
   transferring the first sheet of insulation material from the insulation carrier to the blow molding mold includes moving at least one of the blow molding mold halves towards the insulation carrier;
   providing the at least one blow molding mold half which moves towards the insulation carrier with vacuum; and
   using the vacuum of the at least one blow molding mold half which moves towards the insulation carrier to remove the first sheet of insulation material from the insulation carrier and retain the first sheet of insulation material on the at least one blow molding mold half of the blow mold.

6. The method of claim 1 wherein:
   transferring the first sheet of insulation material from the insulation carrier to the blow molding mold includes moving the insulation carrier towards at least one of the blow molding halves;
   providing the at least one blow molding mold half which the insulation carrier moves towards with vacuum; and
   using the vacuum of the at least one blow molding mold half which the insulation carrier moves towards to remove the first sheet of insulation material from the insulation carrier and retain the first sheet of insulation material on the at least one blow molding mold half.

7. The method of claim 1 further comprising:
   providing a second sheet of insulation material located on the insulation carrier.

8. The method of claim 7 wherein:
   the second sheet of insulation material is retained on the insulation carrier by vacuum.

9. The method of claim 7 wherein:
   the insulation carrier further comprises a second insulation carrying mandrel; and
   providing a second sheet of insulation material located on the insulation carrier further comprises forming the second sheet of insulation material on the second insulation carrying mandrel.

10. The method of claim 9 wherein:
    forming the first sheet of insulation material on the first insulation carrying mandrel further comprises vacuuming forming the first sheet of insulation material on the first insulation carrying mandrel; and
    forming the second sheet of insulation material on the second insulation carrying mandrel further comprises vacuuming forming the second sheet of insulation material on the second insulation carrying mandrel.

11. The method of claim 9 wherein:
    forming the first sheet of insulation material on the first insulation carrying mandrel further comprises forming the first sheet of insulation material on the first insulation carrying mandrel from a first planar sheet of insulation material to a first three-dimensional preform of at least a first portion of the blow molded airflow conduit; and
    forming the second sheet of insulation material on the second insulation carrying mandrel further comprises forming the second sheet of insulation material on the second insulation carrying mandrel from a second planar sheet of insulation material to a second three-dimensional preform of at least a second portion of the blow molded airflow conduit.

12. The method of claim 9 wherein:
    forming the second sheet of insulation material on the second insulation carrying mandrel is performed after heating the second sheet of insulation material.

13. The method of claim 7 further comprising:
transferring the second sheet of insulation material from the insulation carrier to the blow molding mold such that the second sheet of insulation material overlies at least a second portion of the molding surface of the blow molding mold.

14. The method of claim 13 wherein:
transferring the first sheet and the second sheet of insulation material to the blow molding mold includes
moving the blow molding mold halves towards the insulation carrier;
providing each blow molding mold half with vacuum;
using the vacuum of one of the blow molding mold halves to remove the first sheet of insulation material from the insulation carrier and retain the first sheet on the one blow molding mold half of the blow mold; and
using the vacuum of the other of the blow molding mold halves to remove the second sheet of insulation from the insulation carrier and retain the second sheet on the other blow molding mold half of the blow mold.

15. The method of claim 13 wherein:
transferring the first sheet and the second sheet of insulation material to the blow molding mold includes
moving the insulation carrier towards each of the blow mold halves;
providing each blow molding mold half with vacuum;
using the vacuum of one of the blow molding mold halves to remove the first sheet of insulation material from the insulation carrier and retain the first sheet on the one blow molding mold half of the blow mold; and
using the vacuum of the other of the blow molding mold halves to remove the second sheet of insulation from the insulation carrier and retain the second sheet on the other blow molding mold half of the blow mold.

16. The method of claim 7 further comprising:
bonding the extrudate to the second sheet of insulation material overlying at least a second portion of the mold surface of the blow molding mold as the extrudate is being formed to the shape of the mold cavity.

17. The method of claim 1 wherein:
the first sheet of insulation material forms an exposed outer layer of the blow molded airflow conduit.

18. The method of claim 1 wherein:
the extrudate forms at least one inner layer beneath the outer layer of the blow molded airflow conduit; and
wherein the at least one inner layer defines an airflow passage of the blow molded airflow conduit.

19. A method of forming a blow molded plastic article comprising:
providing an insulation carrier, wherein the insulation carrier comprises a first insulation carrying mandrel and a second insulation carrying mandrel;
providing a first sheet of insulation material located on the insulation carrier, wherein providing a first sheet of insulation material located on the insulation carrier comprises forming the first sheet of insulation material on the first insulation carrying mandrel after heating the first sheet of insulation material;
providing a second sheet of insulation material located on the insulation carrier, wherein providing a second sheet of insulation material located on the insulation carrier comprises forming the second sheet of insulation material on the second insulation carrying mandrel after heating the second sheet of insulation material;
providing a blow molding mold, the blow molding mold including two halves and having a molding surface defining a molding cavity to form the blow molded plastic article, wherein the blow molded plastic article comprises a blow molded airflow conduit;
locating the insulation carrier between the two halves of the blow molding mold;
transferring the first sheet of insulation material from the insulation carrier to the blow molding mold such that the first sheet of insulation material overlies at least a first portion of the molding surface of the blow molding mold;
introducing an extrudate of thermoplastic composition between the two halves of the blow molding mold;
closing the blow molding mold;
forming the extrudate to a shape of the mold cavity of the blow molding mold to form the blow molded plastic article;
bonding the extrudate to the first sheet of insulation material overlying at least a first portion of the mold surface of the blow molding mold as the extrudate is being formed to the shape of the mold cavity; and
forming at least one air inlet and at least one air outlet in the blow molded airflow conduit.

20. The method of claim 19 further comprising:
transferring the second sheet of insulation material from the insulation carrier to the blow molding mold such that the second sheet of insulation material overlies at least a second portion of the molding surface of the blow molding mold.

21. The method of claim 19 wherein:
transferring the first sheet and the second sheet of insulation material to the blow molding mold includes
moving the blow molding mold halves towards the insulation carrier;
providing each blow molding mold half with vacuum;
using the vacuum of one of the blow molding mold halves to remove the first sheet of insulation material from the insulation carrier and retain the first sheet on the one blow molding mold half of the blow mold; and
using the vacuum of the other of the blow molding mold halves to remove the second sheet of insulation from the insulation carrier and retain the second sheet on the other blow molding mold half of the blow mold.

22. The method of claim 19 wherein:
transferring the first sheet and the second sheet of insulation material to the blow molding mold includes
moving the insulation carrier towards each of the blow mold halves;
providing each blow molding mold half with vacuum;
using the vacuum of one of the blow molding mold halves to remove the first sheet of insulation material from the insulation carrier and retain the first sheet on the one blow molding mold half of the blow mold; and
using the vacuum of the other of the blow molding mold halves to remove the second sheet of insulation from the insulation carrier and retain the second sheet on the other blow molding mold half of the blow mold.

23. The method of claim 19 further comprising:
bonding the extrudate to the second sheet of insulation material overlying at least a second portion of the mold surface of the blow molding mold as the extrudate is being formed to the shape of the mold cavity.

24. The method of claim 19 wherein:
the first sheet of insulation material forms an exposed outer layer of the blow molded airflow conduit.

25. The method of claim 19 wherein:
the extrudate forms at least one inner layer beneath the outer layer of the blow molded airflow conduit; and
wherein the at least one inner layer defines an airflow passage of the blow molded airflow conduit.

* * * * *